Sept. 8, 1959        H. A. BOON        2,903,370
PREPARATION AND COLD STORAGE OF ICE CREAM
Filed Nov. 18, 1957
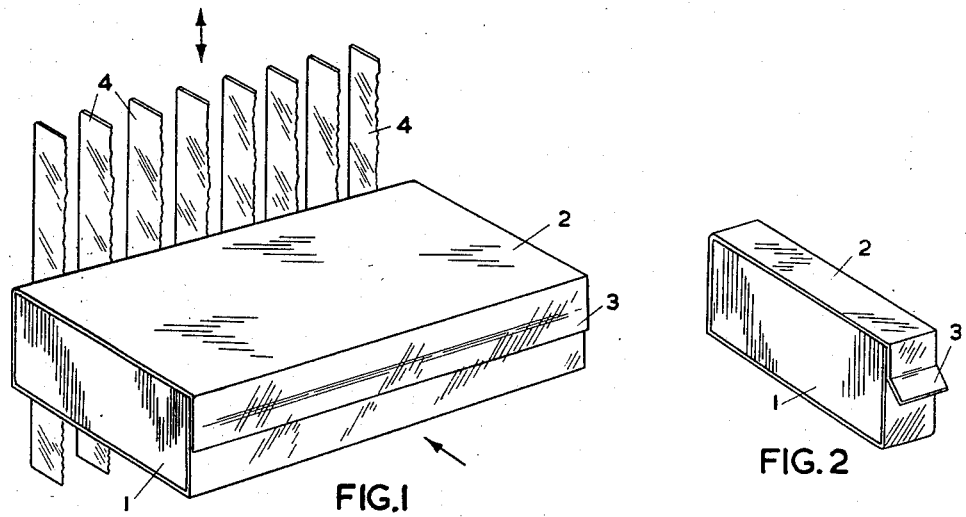
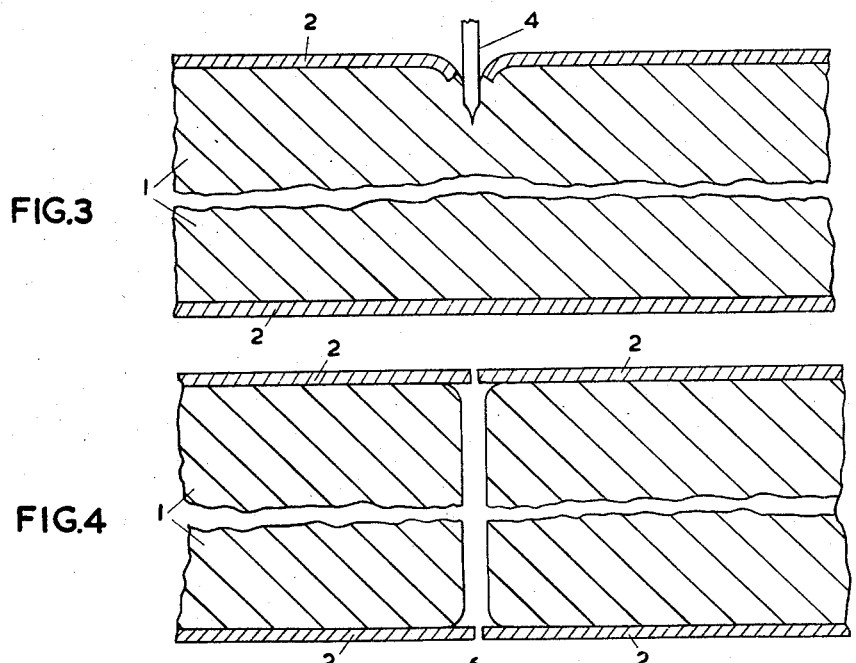
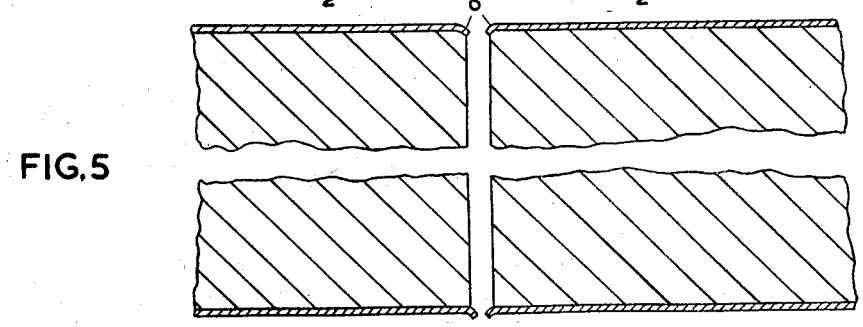

United States Patent Office 2,903,370
Patented Sept. 8, 1959

2,903,370

PREPARATION AND COLD STORAGE OF ICE CREAM

Harold Alfred Boon, Kingston-on-Thames, England, assignor to J. Lyons & Company Limited, London, England Application November 18, 1957, Serial No. 696,991

6 Claims. (Cl. 99—180)

This invention relates to the preparation and cold storage of ice cream for consumption in portions and the present application is a continuation-in-part application of my co-pending application Serial No. 482,575, filed January 18, 1955, now abandoned.

Ice cream for consumption in portions, as is well-known, is dispensed either by spooning the ice cream from a bulk supply into a suitable receptacle from which it is consumed or by withdrawing portions from a store of portions, in the latter case the person dispensing the ice cream not needing to measure each portion of ice cream served. As an example of the latter mode of dispensing, ice cream portions are made in the form of individually wrapped rectangular slices and these are served between wafer biscuits the whole being usually referred to as a "sandwich" or "wafer."

Another method of dispensing individual portions of ice cream is to provide blocks of ice cream, each corresponding in size to a number of individual portions, the block being covered in a suitable wrapping of paper or card, and to cut portions from each block, as required, by means of a knife or similar tool. Such a procedure is unsatisfactory because the shape of the portion of ice cream depends upon the skill of the cutter, and the unused part of the block is exposed whenever it is desired to cut a portion and therefore tends to soften, lose its good appearance and become messy, and the handling required being unhygienic.

On the other hand, it is not possible to divide the block of ice cream into portions before it is wrapped, for the reason that the adjacent surfaces of the cut portions will stick or freeze together and so cannot be satisfactorily separated by the person dispensing the ice cream. Because of this tendency of adjacent surfaces of ice cream to stick together, it has always been the practice, so far as I am aware, to store precut ice cream portions prior to sale with all surfaces of the portions covered by a suitable wrapping medium, usually paper or the like.

While the covering of all the surfaces of the portions in this way is satisfactory from the point of view of storage, it is inconvenient for dispensing, because in many instances the wrapping has to be removed before the portion is offered to the customer or other consumer. The present invention is concerned with the provision of a method of packaging ice cream in individual portions in a way which is hygienic and which is convenient for the dispenser, and which preserves the good appearance of the ice cream as it is offered to the consumer.

Before referring to the difficulties of storing ice cream in portions, it is convenient first to examine the nature of the ice cream itself. Ice cream contains sugar, fat, certain other solids and water; a liquid mixture of these ingredients is chilled and there is introduced into the mixture a quantity of air which approaches about 50% by volume. The mixture is chilled to the point where it is of a plastic nature and is then extruded through a suitable orifice, the air being introduced shortly before extrusion.

The texture and hardness of the ice cream mixture depends to a certain extent upon the composition of the ice cream but especially upon the temperature. As the temperature of the liquid is lowered and the air is introduced, the mixture becomes of a plastic nature and then, as the temperature is lowered, increases in hardness until it becomes almost as hard as pure ice. Whilst the temperatures at which these various phases exist, will vary, it is true generally that the range of temperature over which the mixture is plastic is relatively short. The ice cream is extruded at the lowest possible temperature at which a ribbon of stable form can be satisfactorily extruded so that the ice cream will have as low a temperature as possible before entering a hardening chamber whose temperature is preferably about −30° F. Thereby economy may be effected in the hardening operation and furthermore, the ice cream may be given a characteristic which affects the temperature at which it can be satisfactorily cut, as will appear hereafter. It can then be stored at an appropriately cold temperature for example −15° F. or below.

For sale to a consumer, ice cream must be offered at a temperature which is not extremely low, since a very low temperature is unpleasant and possibly dangerous to the consumer; the temperature at which the best possible taste is obtained is about 16–18° F. It follows that the temperature at which it is permissible for the ice cream to be stored before being offered to the retailer is substantially lower than that at which the ice cream should be maintained ready for sale at consumption. Furthermore, the repeated opening and closing of a retailer's cabinet will cause the temperature to rise, especially where the ambient temperature of the premises is high. Ice cream in a retailer's store will therefore be more subject to deterioration due to the higher temperature and to handling at that temperature, than would be the case with ice cream in a main storage plant.

In general therefore, it is a substantial problem to provide ice cream for sale in portions, in a form which is both satisfactory to the dispenser, in giving simple, rapid and hygienic access to the ice cream, and which, at the same time, is not such as will be conducive to the portions near the plastic temperature of the ice cream, sticking or otherwise having the surfaces thereof made susceptible to damage by contact with adjacent portions of ice cream.

After considerable laboratory testing and development and by extensive field trials, I have found that it is possible to prepare ice cream for sale in portions, by taking a block of ice cream, peripherally wrapped in an appropriate material, the nature of which will be more particularly described hereinafter, and by cutting it into a series of slices, so that each slice then has a peripheral wrapping of the original wrapper. This cutting can take place after the ice cream has been partly but not completely hardened, and once cut in this way the ice cream can be held in cold storage indefinitely without the exposed adjacent surfaces of the ice cream becoming stuck to one another; as will appear hereinafter, it is desired that the cutting of the block into portions should be effected by means of a saw having teeth without set. Moreover, such ice cream portions can be held in a temperature corresponding to that which is appropriate for storage in a retailer's cabinet without danger of sticking of the adjacent surfaces. The retailer can therefore easily and hygienically separate such portions, each with its peripheral wrapping. For sale as an ice cream wafer, the retailer merely need apply a flat wafer biscuit to each exposed surface, and remove the peripheral wrapper.

It is not wholly clear why with a wrapped block of ice cream cut in this way there should be the great advantage that the adjacent surfaces of the portions do not stick together. However, I believe that this effect is due to the fact that the ice cream contains the large proportion of air of the order of 50%, as previously mentioned. When the ice cream is subjected to the saw action, the ice cream is compacted, to an extent which is at least partly related to its air content, with the result that the edges of the peripheral wrapping stand slightly proud of the surface of the ice cream. Moreover, provided that the wrapping is of a sufficient thickness and is capable of withstanding substantial deformation when the saw passes through it, the degree to which the wrapper stands proud of the ice cream in this way is sufficient to ensure that deleterious face-to-face contact of the adjacent surfaces of the ice cream is avoided. I wish it to be understood however, that while this is my belief as to the reason why the desired result is obtained with the process of the present invention, I do not wish to be bound thereby.

In order that the present invention may be well understood I will now describe an embodiment thereof, given by way of example only, reference being had to the accompanying drawing in which Figure 1 is a diagrammatic perspective view of a simple arrangement for cutting a block of ice cream into sections;

Figure 2 is a perspective view of one of the sections of ice cream cut from the block.

In carrying the invention into effect, therefore, a block of ice cream 1 is wrapped in a container 2 of paperboard. This container can be completely closed if desired, or it may be in the form of a tube, as shown, conforming to the shape of the ice cream block. It is advantageous if the container is formed of a strip of paperboard with an overlapping flap 3 at the join, so that the join can be broken by pulling on the flap. Depending upon the nature of the wrapper, the ice cream can be introduced into it by horizontal extrusion from a stationary nozzle or by vertical extrusion from a moving nozzle. The method of producing the wrapped block is not, however, important provided that the wrapper is of a certain minimum thickness, of the order of .015 inch for paperboard.

Further cooling of the ice cream is then effected in any suitable manner and the ice cream block, cooled until it is relatively hard, is then cut transversely into slices by pressing it against a saw frame. This frame includes a series of fine toothed saws 4, the teeth of which have no set, the saws being rapidly reciprocated lengthwise, but with only a small amplitude of motion. It may be arranged that adjacent saws move in opposite directions at any given moment, thus minimizing the out of balance force on the block.

The slices of ice cream produced in this way, each with a strip of paperboard round its periphery as shown in Figure 2, are found to be capable of being packaged together without interposed separators either by being further wrapped in paper, or placed in an outer container. When cased or wrapped the portions can be handled in the normal manner without the disadvantage of the adjacent slices sticking together. The portions from a series of blocks can of course be packed together in a common casing or wrapping if desired.

The wrapping which is used must have a certain minimum thickness and this minimum will depend upon the conditions during extrusion of the ice cream. The thinnest wrapping is of the order of .014 inch whilst satisfactory results have been achieved with wrapping up to .018 inch.

The saw or knife is preferably provided with teeth, since if no teeth are provided the resistance offered by the saw is unduly high. It appears necessary that the saw or knife have of the order of 4 to 15 teeth per inch. Furthermore the teeth should preferably have no set, since a saw with set produces sawdust particles which may result in adhesion of the portions during storage.

The speed of reciprocation of the saw is governed partly by the degree of noise which is produced but specially by the need to produce portions having clean, smooth ice cream surfaces; it has been found that a highly satisfactory cutting operation can be effected with a speed of vibration of 1,400 vibrations per minute, and that the lower limit of speed is that at which a clean surface is no longer achieved. The preferred speed of the cutter is 1,000 vibrations per minute. The teeth of the saw blades are preferably of scalloped form and the amplitude of motion of the blades is preferably between a ¼ inch and ¾ inch. This figure is determined by the ambient temperature of the area in which the cutting operation is to be carried out. If the ambient temperature is high the saw blades will become warm at the extremities of their travel and as a result they will cause the ice cream to melt and this in turn will lead to sticking of the portions during storage. In an ambient temperature of the order of 65° F. the preferable amplitude is ½ inch. Thus for the preferred cutter speed of 1,000 vibrations, an instantaneous linear speed of about 1,000 inches per minute would be achieved. It is also possible to carry out the cutting operation with a continuous saw provided that the temperature of the blade as it enters the ice cream is sufficiently low to avoid melting of the ice cream.

The ice cream should be of a hardness which, in combination with the saw speed and other factors, gives a clean surface to the ice cream and to the board, a suitable hardness being one which is equivalent to that of ice cream containing 13% sugar (sucrose), 10% milk solids (not fat), 10% fat and 34% total solids, and having 100% overrun (that is containing 50% by volume of air), which has been extruded at a temperature of 21° F. and which has a temperature between approximately —5° and —10° F. The hardness may however be equivalent to that of ice cream having a slightly different composition, that is to say, 15% sugar (sucrose), 10½% milk solids (not fat), 11½% fat and 37.5% total solids, and having the same percentage overrun which has been extruded at 18°–21° F. and which is at a temperature of —5° F. to 0° F. If the ice cream is too soft it will be unacceptably deformed by the cutter, and on the other hand if it is too hard it will present an unnecessarily high resistance to the cutter. For ice cream of different composition and/or percentage overrun, the relative temperature ranges of extrusion and cutting will differ from those indicated above.

It has been found that ice cream portions made in the following manner can be packed without placing spacers between the exposed ice cream surfaces and cold stored under normal conditions without sticking so that upon retail sale a hygienic unspoiled product is provided:

(I) Extruding at 22° to 23° F. ice cream containing 13% sugar (sucrose), 10% milk solids (not fat), 10% fat and 34% total solids and having 100% overrun (that is to say containing 50% by volume of air) into a container of white lined folding box board .0165 inches thick, passing the wrapped ice cream through a freezing tunnel at —35° F. for one hour, tempering the wrapped ice cream at —8° F. for two hours, cutting the ice cream by means of reciprocating cutter blades having teeth of scalloped form at 4½ teeth per inch, vibrating at 1,000 vibrations per minute and an amplitude of ½ an inch, the cutting being carried out in an ambient temperature of 65° F.

(II) Extruding at 22° to 23° F. ice cream having a similar composition and extruded at the same temperature into a container of white lined folding box board .018 inches thick, using a saw having 12 teeth to the inch and an amplitude of movement of about ½ an inch, the speed of reciprocation being 1,000 vibrations per minute.

(III) Extruding at 18° F. ice cream having an air content of 50% by volume and 15% sugar (sucrose), 11½% fat, 10½% milk solids (not fat), and 37½% total solids into a container of white lined folding box board .014 inch thick passing the wrapped ice cream through a freezing tunnel —30° F. for 45 minutes, tempering the wrapped ice cream at —17° to —20° F. for 15 minutes and cutting the wrapped ice cream with a saw having the same form of teeth and number of teeth to the inch and amplitude as in Example I and vibrating at 1,500 vibrations per minute, the cutting being carried out at a temperature of the ice cream of between —5° and 0° F.

In Examples I and II the saw blades made a cut 3½ inches long by 1⅝ inches deep. At 1,000 vibrations per minute with the ice cream at —5° F. the cuts were made in four seconds. At 1,500 vibrations per minute the cutting time was halved. In Example III for a similar size of cut the time taken was two seconds.

As a result of the tests which I have carried out, I believe that the operation of the knives, in securing the desired effect with the present invention, can be demonstrated by the accompanying Figures 3, 4 and 5 which are fragmentary cross section views of the wrapped block of ice cream adjacent the cut. In Figure 3, the saw blade 4 is shown as having no set. When the saw blade is first applied to the surface of the wrapped block the outer wrapping 2 will first be cut by the saw which will then enter the body 1 of the ice cream. As the saw passes through the block, it will cause a loss of air from the ice cream through which it passes, both by the mechanical force transmitted to the ice cream, and by the pressure exerted by the blade upon the ice cream. In practice, there is also a small measure of flow of ice cream at the saw cut but after the saw has passed through the ice cream the card 2 has sufficient resiliency to revert to approximately its initial position, in the manner indicated in Figure 4.

On the other hand, if a peripheral wrapping of a relatively thin material is used, such as paper, the paper will have insufficient strength to resist the deformation caused by the saw and the result will be that with the paper wrapping the cut surfaces adjacent the ice cream will appear somewhat as shown in Figure 5. Here, it will be seen that the edges 6 of the wrapper are bent inwardly and are permanently deformed. Comparison of Figures 4 and 5 will show that when the cut portions of ice cream are brought into contact, as will happen when the portions are packaged, there will be an inadequately small separation between the adjacent surfaces of the ice cream in Figure 5, whereas with the arrangement of Figure 4 the stiffness of the peripheral card ensures an adequate separation of the cut surfaces.

Figures 3 and 4 also demonstrate the reason why it is desirable to use a saw having no set to the teeth. In the first place, if the teeth have a set, it is inevitable that the card will not be merely cut, but fibres will be torn from the edge of the cut. The fibres will be detached and may become embedded in the surface of the ice cream which will impair its appearance. Principally, however, if a saw having teeth with a set are used part of the card is removed and this will tend to decrease the effect of spacing between the surfaces. This is obviously undesirable, as it will increase the possibility of sticking occurring between the adjacent faces of the ice cream; it will also be apparent from Figures 3 and 4 that the ice cream when cut by the saws must be in a condition such that it is able to withstand the sawing action without appreciable deformation. If the ice cream is unduly plastic, it may not be possible to maintain an adequately clean surface of the cut ice cream.

I claim:

1. A method of preparing and cold storing ice cream having an air content of the order of 50% by volume comprising the steps of preparing a body of ice cream to a hardness equivalent to that of ice cream containing 13% sugar (sucrose), 10% milk solids, not fat, 10% fat and 34% total solids at a temperature of —5° to —10° F. in a peripheral wrapping of paperboard having a thickness of substantially .015 inch; severing said wrapped body of ice cream into a plurality of peripherally wrapped ice cream portions by means of a reciprocating saw having from 4-15 teeth per inch with no set, said saw having an amplitude of movement of about ½ inch and a speed of reciprocation of about 1000 vibrations per minute; to cause the exposed surfaces of ice cream in each of said portions to lie between the planes defined by the edges of the wrapping at each end of the portion, and cold storing said portions contiguously side by side so that after storage the portions are readily separable one from the other.

2. A method of preparing and cold storing ice cream having an air content of about 50% by volume comprising the steps of preparing a body of ice cream to a hardness equivalent to that of ice cream containing 13% sucrose, 10% milk solids, and 34% total solids at a temperature of —10° F. in a peripheral paperboard wrapping having a thickness of substantially .015 of an inch; severing said wrapped body of ice cream into a plurality of peripherally wrapped ice cream portions by means of a reciprocating saw having teeth of about 6 to about 15 teeth per inch with no set thereto, said saw having an amplitude of movement of about ½ inch and a speed of reciprocation of about 1,000 vibrations per minute so that the exposed surfaces of ice cream in each of said portions lie inwardly between the planes defined by the respective corresponding edges of the wrapping at each end of the portion; and cold storing said portions side by side, whereby after cold storage the portions are readily separable one from the other.

3. A method of preparing and cold storing ice cream as defined in claim 2 wherein said body of ice cream is simultaneously severed into a plurality of peripherally wrapped ice cream portions by means of a plurality of said saws arranged in spaced parallel relationship.

4. A method of preparing and cold storing ice cream as defined in claim 3 wherein said severing is caused under such conditions as to prevent melting of the surfaces exposed thereby.

5. A method of preparing and cold storing ice cream having an air content of the order of 50% by volume comprising the steps of preparing a body of ice cream to a hardness equivalent to that of ice cream containing 13% sugar (sucrose), 10% milk solids, not fat, 10% fat and 34% total solids at a temperature of —5° to —10° F. in a peripheral wrapping of paperboard having a thickness of about .014 inch; severing said wrapped body of ice cream into a plurality of peripherally wrapped ice cream portions by means of a saw having from 4 to 15 teeth per inch with no set and an instantaneous linear speed of movement in the sawing direction of about 1000 inches/minute to cause the exposed surfaces of ice cream in each of said portions to lie between the planes defined by the edges of the wrapping at each end of the portion, and cold storing said portions contiguously side by side whereby after storage the portions are readily separable one from the other.

6. A method of preparing and cold storing ice cream having an air content of the order of 50% by volume comprising the steps of preparing a body of ice cream to a hardness equivalent to that of ice cream at —5° F. to 0° F. containing 15% sugar (sucrose), 11½% fat, 10½% milk solids (not fat), and 37½% total solids having 100% overrun and which has been extruded at a temperature of 18° F. to 21° F. in a peripheral wrapping of paperboard having a thickness of about .014 inch; severing said wrapped body of ice cream into a plurality of peripherally wrapped portions by means of a saw having from 4 to 15 teeth per inch with no set and an instantaneous linear speed of movement in the sawing direction of about 1000 inches/minute to cause the exposed surfaces of ice cream in each of said portions to lie inwardly between the planes defined by the edges of the wrapping at each end of the portion, and cold storing said portions contiguously side by side, whereby after cold storage the portions are readily separable one from another.

References Cited in the file of this patent

UNITED STATES PATENTS

| | | |
|---|---|---|
| 1,810,864 | Vogt | June 16, 1931 |
| 1,906,183 | Vogt | Apr. 25, 1933 |
| 2,062,249 | Clearwater | Nov. 24, 1936 |
| 2,062,277 | Routh | Nov. 24, 1936 |
| 2,062,539 | Vogt | Dec. 1, 1936 |

UNITED STATES PATENT OFFICE

CERTIFICATE OF CORRECTION

Patent No. 2,903,370 September 8, 1959

Harold Alfred Boon

It is hereby certified that error appears in the printed specification of the above numbered patent requiring correction and that the said Letters Patent should read as corrected below.

Column 6, line 20, for "of about" read -- of from about --.

Signed and sealed this 23rd day of February 1960.

(SEAL)
Attest:

KARL H. AXLINE
Attesting Officer

ROBERT C. WATSON
Commissioner of Patents